US008098890B2

United States Patent
Haseyama (10) Patent No.: US 8,098,890 B2
(45) Date of Patent: Jan. 17, 2012

(54) IMAGE PROCESSING APPARATUS FOR REDUCING EFFECTS OF FOG ON IMAGES OBTAINED BY VEHICLE-MOUNTED CAMERA AND DRIVER SUPPORT APPARATUS WHICH UTILIZES RESULTANT PROCESSED IMAGES

(75) Inventor: Miki Haseyama, Sapporo (JP)

(73) Assignees: DENSO CORPORATION, Kariya (JP); National University Corporation Hokkaido University, Hokkaido (JP)

( * ) Notice: Subject to any disclaimer, the term of this patent is extended or adjusted under 35 U.S.C. 154(b) by 835 days.

(21) Appl. No.: 12/157,742

(22) Filed: Jun. 12, 2008

(65) Prior Publication Data
US 2008/0317287 A1    Dec. 25, 2008

(30) Foreign Application Priority Data

Jun. 13, 2007    (JP) ................. 2007-156594

(51) Int. Cl.
    *G06K 9/00*    (2006.01)
(52) U.S. Cl. ....................................... 382/103
(58) Field of Classification Search .................. 382/103
See application file for complete search history.

(56) References Cited

U.S. PATENT DOCUMENTS

| 2007/0071362 A1* | 3/2007 | Milanfar et al. ............... 382/299 |
| 2008/0110556 A1 | 5/2008 | Kawasaki |
| 2008/0170754 A1 | 7/2008 | Kawasaki |

FOREIGN PATENT DOCUMENTS

| DE | 10 2008 003 948 | 7/2008 |
| EP | 0 534 996 | 11/1994 |
| JP | 06-113308 | 4/1994 |
| JP | 2003-067755 | 3/2003 |
| JP | 2006-349492 | 12/2006 |
| WO | WO 92/00569 | 1/1992 |

OTHER PUBLICATIONS

Hiramatsu, T.; Ogawa, T.; Haseyama, M.; , "A Kalman filter based restoration method for in-vehicle camera images in foggy conditions," Acoustics, Speech and Signal Processing, 2008. ICASSP 2008. IEEE International Conference on , vol., no., pp. 1245-1248, Mar. 31, 2008-Apr. 4, 2008.*

(Continued)

*Primary Examiner* — Brian Werner
*Assistant Examiner* — Nirav G Patel
(74) *Attorney, Agent, or Firm* — Harness, Dickey & Pierce, PLC (57) ABSTRACT

Kalman filter processing is applied to each of successive images of a scene obscured by fog, captured by an onboard camera of a vehicle. The measurement matrix for the Kalman filter is established based on currently estimated characteristics of the fog, and intrinsic luminance values of a scene portrayed by a current image constitute the state vector for the Kalman filter. Adaptive filtering for removing the effects of fog from the images is thereby achieved, with the filtering being optimized in accordance with the degree of image deterioration caused by the fog.

8 Claims, 7 Drawing Sheets

OTHER PUBLICATIONS

Amditis, A.; Polychronopoulos, A.; Karaseitanidis, I.; Katsoulis, G.; Bekiaris, E.; , "Multiple sensor collision avoidance system for automotive applications using an IMM approach for obstacle tracking," Information Fusion, 2002. Proceedings of the Fifth International Conference on , vol. 2, no., pp. 812-817 vol. 2, 2002.*

N. Hautiere, J.-P. Tarel, J. Lavenant, and D. Aubert. Automatic fog detection and estimation of visibility distance through use of an onboard camera. Machine Vision and Applications, 17(1):8-20, Apr. 2006.*

Turney, R.D. et al., "FFGA implementation of adaptive temporal Kalman filter for real time video filtering", Acoustics, Speech, and Signal Processing, 1999, ICASSP '99, Proceedings., IEEE Int. Conf., vol. 4, 1999, pp. 2231-2234.

Doblinger, G., "An adaptive Kalman filter for the enhancement of noisy AR signals", Circuits and Systems, ISCAS '98, Proc. of the IEEE Int. Symp., vol. 5, pp. 305-038.

C. Hu, et al., "Adaptive Kalman Filter for Vehicle Navigation", Journal of Global Positioning Systems, 2003, vol. 2, No. 1, pp. 42-47.

Hautière, N., et al., "Contrast Restoration of Foggy Images through use of an Onboard Camera", IEEE Conf. on Intelligent Transportation Systems (ITSC '05), Vienna, Austria, pp. 1090-1095, 2005.

Office Action dated May 6, 2010 in German Application No. 10 2008 027 723 with English translation thereof.

Hautiere, Nicolas et al, "Automatic Fog Detection and Estimation of Visibility Distance Through Use of an Onboard Camera", pp. 1-126, Apr. 2006.

Hautiere, Nicolas et al, "Contract Restoration of Foggy Images Through Use of an Onboard Camera"; Proceedings of the $8^{th}$ International IEEE Conference on Intelligent Transportation Systems; Vienna, Austria; Sep. 13-16, 2005; pp. 1090-1095.

Hiramatsu, Tomoki et al, "A note on accurate restoration of in-vehicle camera images in foggy conditions, Application of fog deterioration model to Kalman filter"; The Institute of Electronics, Information and Communication Engineers; pp. 1-6, Jun. 2007.

W.E. Knowles Middleton, "Vision Through the Atmosphere", University of Toronto Press; 1952; pp. v-250.

* cited by examiner

FIG. 7C $$A(t) = \begin{bmatrix} 0 & 1 & 0 & 0 & 0 & 0 & 0 & 0 & 0 \\ 0 & 1 & 0 & 0 & 0 & 0 & 0 & 0 & 0 \\ 0 & 0 & 1 & 0 & 0 & 0 & 0 & 0 & 0 \\ 0 & 1 & 0 & 0 & 0 & 0 & 0 & 0 & 0 \\ 0 & 0 & 0 & 1 & 0 & 0 & 0 & 0 & 0 \\ 0 & 0 & 0 & 0 & 1 & 0 & 0 & 0 & 0 \\ 0 & 0 & 0 & 0 & 0 & 0 & 1 & 0 & 0 \\ 0 & 0 & 0 & 0 & 0 & 0 & 1 & 0 & 0 \\ 0 & 0 & 0 & 0 & 0 & 0 & 0 & 0 & 1 \end{bmatrix}$$

IMAGE PROCESSING APPARATUS FOR REDUCING EFFECTS OF FOG ON IMAGES OBTAINED BY VEHICLE-MOUNTED CAMERA AND DRIVER SUPPORT APPARATUS WHICH UTILIZES RESULTANT PROCESSED IMAGES

CROSS-REFERENCE TO RELATED APPLICATIONS

This application is based on and incorporates herein by reference Japanese Patent Application No. 2007-156594 filed on 13 Jun., 2007.

BACKGROUND OF THE INVENTION

1. Field of Application

The present invention relates to an image processing apparatus for processing images that are successively captured by an onboard camera of a vehicle and are affected by fog, with the apparatus generating corresponding restored images having effects of the fog substantially removed. The invention further relates to a driver support apparatus which utilizes the restored images.

2. Description of Related Art

Types of driver support apparatus are known whereby an onboard camera on a vehicle captures successive images of a region ahead of the vehicle, with the resultant images being displayed directly or after having been subjected to image processing. The images may be displayed to the driver and/or processed to detect objects appearing in them, with these being referred to in the following as target objects. The image processing results can be used to ascertain the road conditions in which the vehicle is travelling and to detect the presence of target objects which require caution, and so can be used in various ways to assist the driver in controlling the vehicle.

It has been proposed (for example in Japanese patent application first publication No. 2003-067755, referred to in the following as reference document 1) to use Kalman filter processing of images, in a driver support apparatus that incorporates an image processing apparatus. The purpose of using Kalman filter processing is to track specific image contents that appear in successive images captured by an onboard camera of the vehicle. Such specific image contents can for example be an edge of a white line on the road surface, specific regions of high luminance in the image, etc.

However the camera will in general be sensitive only to light that is within the visible spectrum. Hence, when the vehicle is being driven in a region affected by fog, the camera as well as the vehicle driver will experience reduced visibility of the surroundings of the vehicle. That is to say, there will be a reduced degree of variations in luminance values of objects appearing in images captured by the camera, so that the images will become low in contrast and blurred. It thereby becomes difficult for specific parts of successive images to be tracked. Thus it becomes difficult to detect specific objects in the processed output images, so that it may no longer be possible to provide a sufficient degree of driver support.

With an another type of apparatus (for example as described in Japanese patent application first publication No. 6-113308, referred to in the following as reference document 2), a system is utilized in which variations in density of fog are judged, and a currently captured image is adjusted based upon the positions of high-luminance regions in the image and upon an image which was captured immediately prior to time at which the fog became dense. The resultant adjusted image is displayed by the apparatus.

However with the apparatus of reference document 2, if a condition of thick fog continues for some time, then the actual surroundings of the vehicle may become substantially different from those prior to the time at which the fog started to become dense. Thus, an image that was captured prior to the fog becoming dense may not accurately correspond to the current environment of the vehicle, and so cannot be used as a reliable reference image. Hence if there are no objects of sufficiently high luminance in images that are captured during the condition of dense fog, the apparatus cannot function effectively.

SUMMARY OF THE INVENTION

It is an objective of the present invention to overcome the above problems, by providing an image processing apparatus capable of operating on images that are successively captured by a vehicle-installed camera, to derive corresponding restored images which have accurately restored values of luminance, with the effects of fog upon the restored images being substantially reduced. It is a further objective to provide a driver support apparatus which utilizes the restored images obtained by the image processing apparatus.

To achieve the above objects, according to a first aspect, the invention provides an image processing apparatus which applies a Kalman filter processing algorithm to each of successive fog-affected images captured by a camera, for deriving restored images from which the image-obscuring effects of fog have been substantially removed. With the present invention, Kalman filter processing is applied separately to each of a plurality of blocks of pixels which constitute a fog-affected image.

More specifically, in applying Kalman filter processing to such a pixel block, the luminance values of the pixels (i.e., the values as acquired obtained by a camera) constitute the measurement vector for the Kalman filter, and the intrinsic luminance values of the pixels (i.e., actual luminance values of a scene represented in the image) constitute the state vector. In addition, the measurement matrix is established based on a parameter (referred to herein as a deterioration parameter) that is determined based on a degree of attenuation of transmitted light that is due to fog, with respective values of this deterioration parameter being calculated for each of the pixel blocks of an image that is processed.

With a described embodiment of the invention, the measurement matrix is a scalar matrix, in which the scalar value is that of the aforementioned deterioration parameter.

For each pixel block, block matching is performed against a precedingly obtained image, to obtain a corresponding motion vector, i.e., to locate a (motion-compensated) corresponding block in the preceding image. The state transition matrix for the Kalman filter (expressing changes that occur in the state vector during an interval between acquiring successive images) is established based on any differences between the luminance values of pixels of the current pixel block and those of the motion-compensated corresponding block from the preceding image.

The effects of fog are handled as a characteristic of the measurement system, since a prediction block from a fog-affected image constitutes the Kalman filter measurement matrix, and the state vector is constituted by the intrinsic luminance values of a pixel block of the input image (i.e., values that would be obtained if the image were free from obscuring effects such as fog). Predicted values for the state vector are thereby obtained for each block of an input image, and a set of restored pixel blocks are thereby derived which constitute a restored image, having the effects of fog substantially removed.

Since the Kalman filter is inherently an adaptive type of filter, each restored image can be derived by image processing that is optimized in accordance with changes in the characteristics of the fog.

When performing block matching processing to obtain motion vectors between blocks of a current image and a precedingly obtained image, the blocks of the current image would normally be used directly, i.e., would be compared with a previously obtained image (which has been subjected to Kalman filter processing). However due to reduced image contrast, it may become difficult or impossible to accurately obtain the motion vectors in that way, when the input images are obscured by effects of dense fog. Thus from another aspect of the invention, before performing block matching processing of a pixel block of an input image, the luminance values of the block are processed based on the estimated characteristics of the fog, to partially compensate for the effects of the fog and thereby obtain a corresponding "provisionally restored" pixel block. Since the provisionally restored block can have sufficiently high contrast for performing block matching, accurate block matching the corresponding motion vector can be reliably obtained, and the corresponding transition matrix for the Kalman filter can thus be accurately obtained.

A provisionally restored pixel block is not as accurate as a restored pixel block (restored state vector) that is obtained by the Kalman filter. However the effects of fog on the provisionally restored pixel block are less than its effects upon the original image. Hence, using a state transition matrix that is derived by using a provisionally restored pixel block will provide more accurate results than can be achieved by directly using a pixel block from an input image.

From another aspect, the invention provides a driver support apparatus which incorporates such an image processing apparatus, together with a camera apparatus mounted in a vehicle, which captures data expressing images of a scene external to the vehicle and supplies the image data to the image processing apparatus. Resultant restored images which are derived by the image processing apparatus can be displayed by a display section of the driver support apparatus.

With such a driver support apparatus, even when visibility in the surroundings of the vehicle becomes lowered due to effects of fog, the displayed restored images provide the vehicle driver with more clear and accurate information concerning conditions external to the vehicle than can be achieved by directly displaying fog-affected images, or images which have been processed using prior art techniques for reducing the effects of fog on the images.

It is not essential that the driver support apparatus be configured to only display the restored images, and it can equally be configured to detect specific target objects in the surroundings of the vehicle based on the contents of the restored images. Results obtained by such target object detection can for example be applied to control a part of the vehicle operation (such as the degree of braking force), to thereby provide support for the driver when driving in conditions of reduced visibility due to fog, etc. In that case, improved reliability of target object detection can be achieved with the present invention, since image processing can be performed based on provisionally restored luminance values of an image. Image processing is thereby facilitated, and more reliable driver support provided.

DESCRIPTION OF PREFERRED EMBODIMENTS

Figure 1:
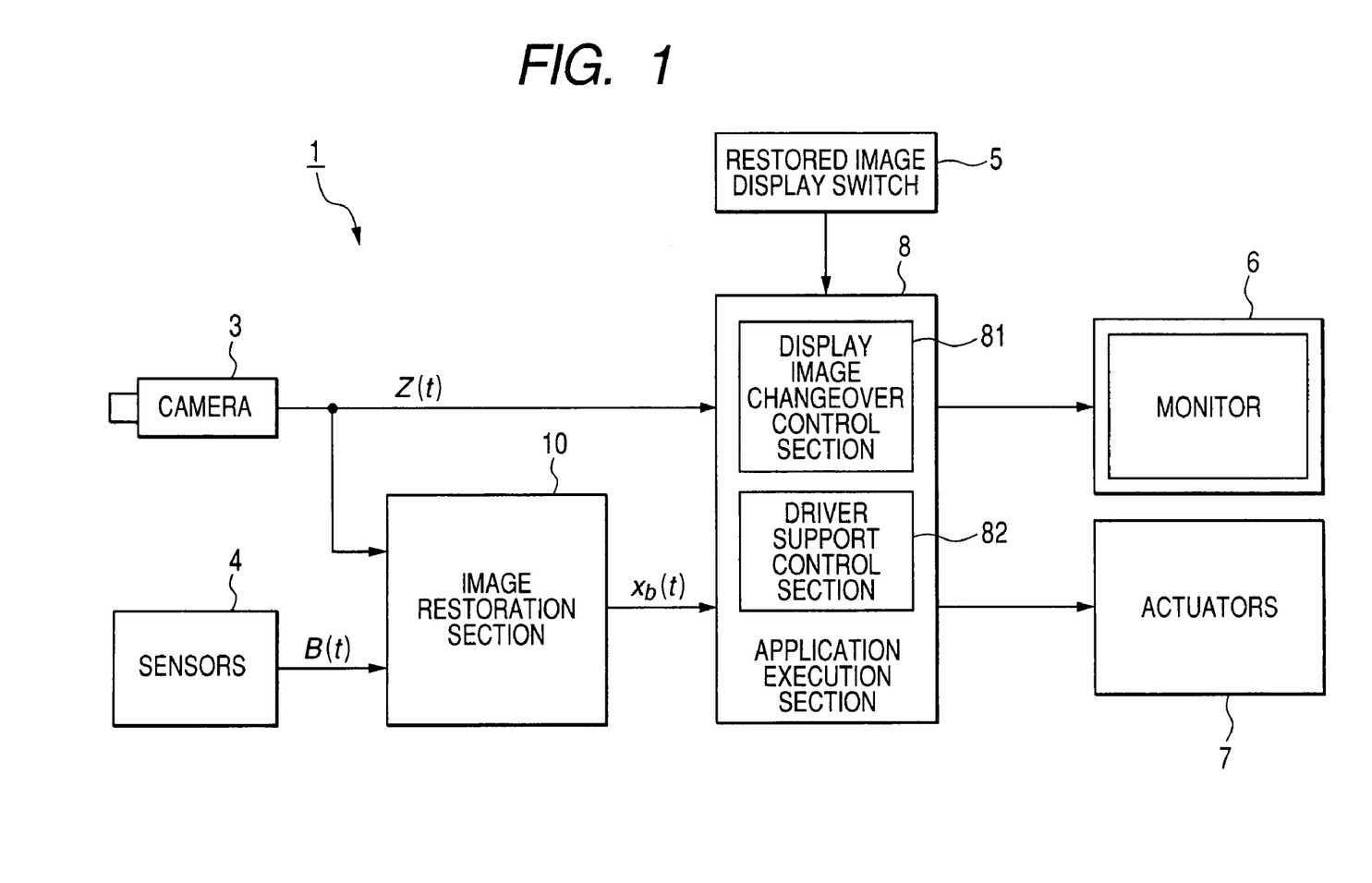
FIG. 1 is a block diagram showing the overall configuration of an embodiment of a driver support apparatus.
Figure 2:
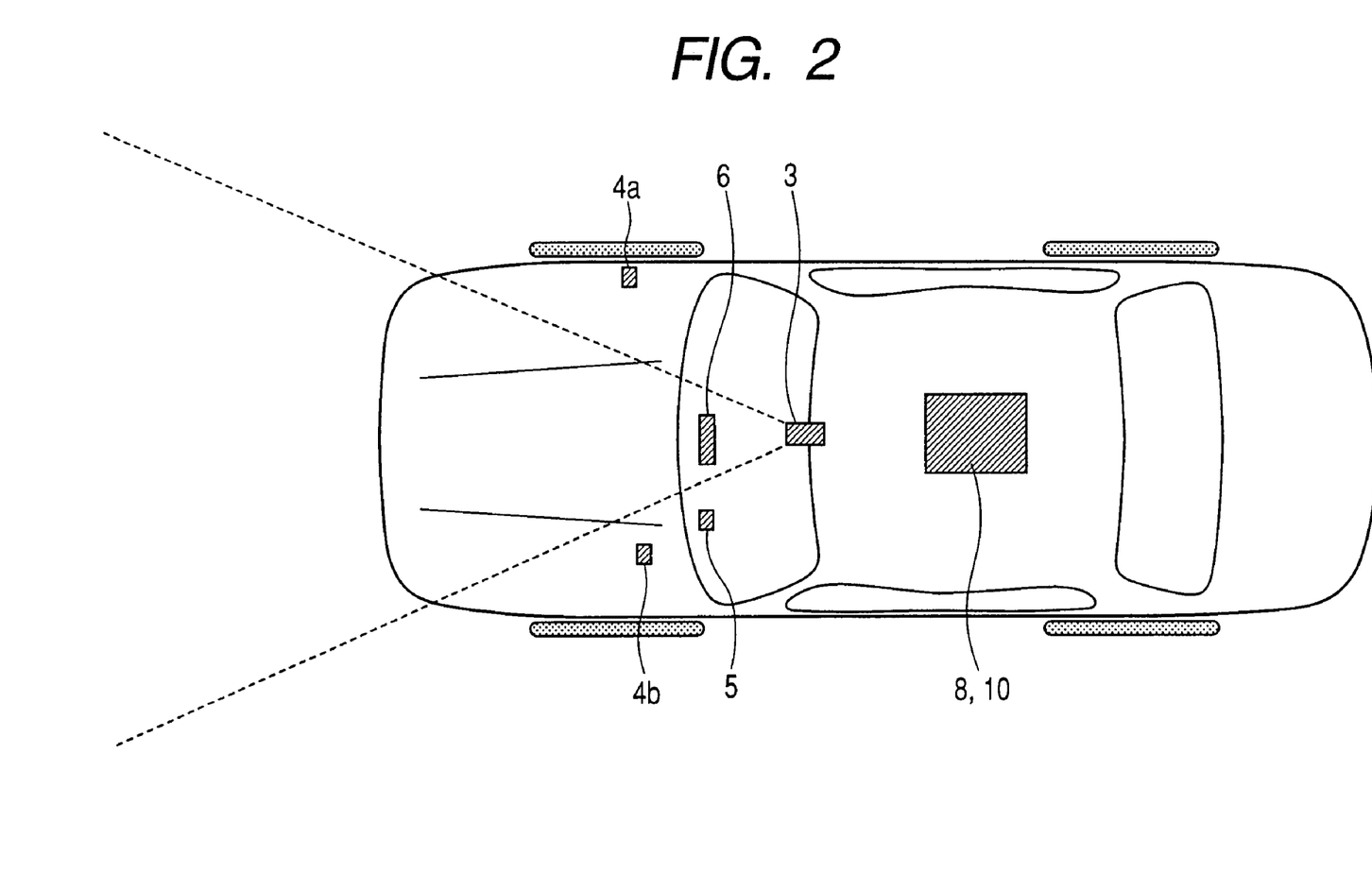
FIG. 2 is a diagram illustrating the layout of various components of the driver support apparatus embodiment, within a vehicle.

FIG. 1 is a block diagram illustrating the overall configuration of a driver support apparatus 1, while FIG. 2 shows the locations of various components of the embodiment, installed in a motor vehicle.

As shown in FIGS. 1 and 2, the driver support apparatus 1 includes a camera 3 which is located at an upper central location of the windshield, in the passenger compartment of the vehicle and which captures successive images of a region ahead of the vehicle, referred to in the following as the input images. The driver support apparatus 1 further includes a group of sensors 4 (in the example of FIG. 2, an acceleration sensor 4a and a yaw rate sensor 4b but which may also include a pitch angle sensor and a steering angle sensor, etc.) for detecting various physical quantities relating to behavior of the vehicle such as the vehicle speed, yaw, pitch, etc. The driver support apparatus 1 further includes an image restoration section 10 which generates restored images having the effects of fog substantially removed, with the restored images being generated based on the input images and on the behavior data obtained from the sensor group 4. The driver support apparatus 1 also includes a restored image display switch 5 which is operable for selecting either the restored images of the images directly obtained by the camera 3, to be displayed by a monitor 6, a group of actuators 7 (not shown in FIG. 2) which are subjected to driver support control, and an application execution section 8. As shown, the application execution section 8 includes a display image changeover control section 81 which performs image display changeover under control of the restored image display switch 5, and a driver support control section 82 which supports the vehicle driver by monitoring the conditions in which the vehicle is driving (based on the restored images or on directly supplied input images) and operating the actuators 7 accordingly.

The camera 3 is a usual type of digital video camera which captures each input image as digital data expressing respective luminance values of pixels of the image.

The actuators 7 serve for example to control the braking force, propulsive force, the suspension system, and the transmission system, etc., of the vehicle. The application execution section 8 is implemented by a microcomputer, which is programmed to execute the functions of the display image changeover control section 81 and the driver support control section 82.

When the restored image display switch 5 is switched off, the application execution section 8 processes input images that are supplied directly from the camera 3, while when the restored image display switch 5 is switched on, the application execution section 8 processes restored images that are supplied from the image restoration section 10. The driver support control section 82 performs image processing of the input images or restored images, for recognizing positions and/or motion of objects located ahead of the vehicle. When dangerous obstacles are thereby detected, the driver support control section 82 performs appropriate operations for supporting the vehicle driver, such as generating a warning indication, increasing the braking force, etc.

Image Restoration Section

The image restoration section 10 is configured as a usual type of microcomputer made up of a ROM, RAM, CPU, etc., and operates under a control program to execute processing described in the following. It should be noted that it would be possible to implement the functions of the application execution section 8 and the image restoration section 10 in common by a single microcomputer, rather than by separate microcomputers.

Image Deterioration Model

Figure 3:
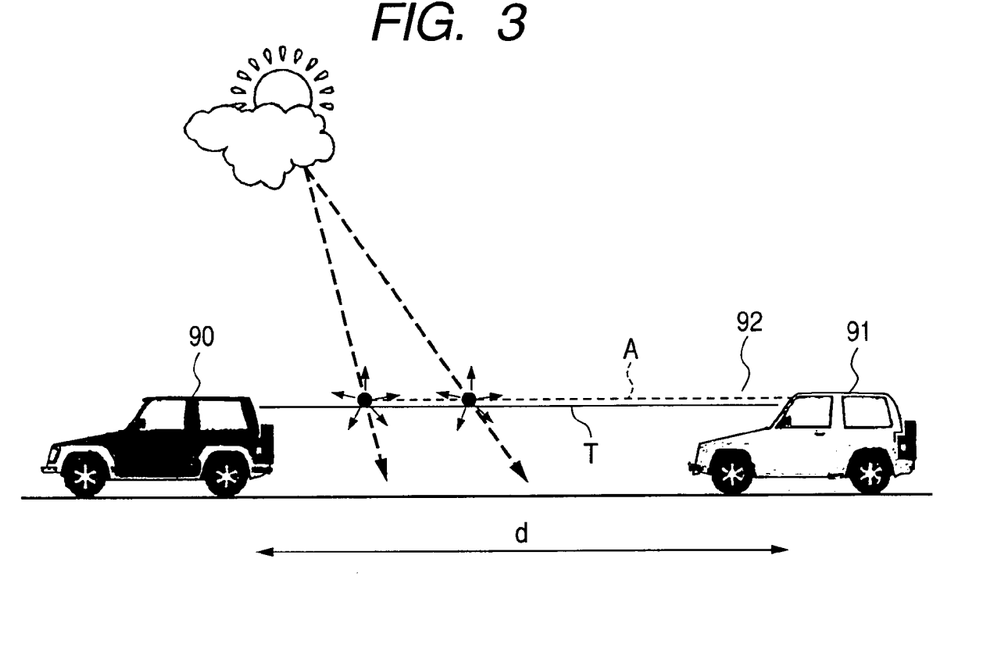
FIG. 3 shows a model illustrating the effects of fog upon transmission of light.

Assumptions used for the purpose of processing by the image restoration section 10 can be expressed by a deterioration model which describes the absorption and diffusion effects of atmospheric fog upon transmitted light under daylight conditions, as shown in FIG. 3. Designating T as the level of light that is received at measurement position 92 by being transmitted from a target object 90 (i.e., light that has been reflected from or emitted from the target object 90) and designating A as the intensity of fog-dispersed light that is received at the measurement position 92 and which results from dispersion of sunlight by particles in the fog, then the resultant deteriorated luminance I that is received at the measurement position 92 can be expressed as:

$$I = T + A \quad (1)$$

In addition, designating the intrinsic luminance of the measurement object 90 as R, designating $A_\infty$ as the intensity of fog-dispersed light received at the measurement position 92 from a direction extending to the horizon, the distance from the measurement position 92 to the measurement object 90 as d, and β as the extinction coefficient of the atmosphere, equation (1) can be rewritten as the following equation (2):

$$I = R \cdot e^{-\beta d} + A_\infty (1 - e^{-\beta d}) \quad (2)$$

βd and $A_\infty$ (referred to in the following as the deterioration parameters) which appear in equation (2) can be expressed by the following equations (3) and (4) respectively:

$$\beta d = 2 \cdot \frac{v_i - v_h}{v - v_h} \quad (3)$$

$$A_\infty = I_i + \frac{v_i - v_h}{2} \cdot \left.\frac{dI}{dv}\right|_{v = vi} \quad (4)$$

Figure 4:
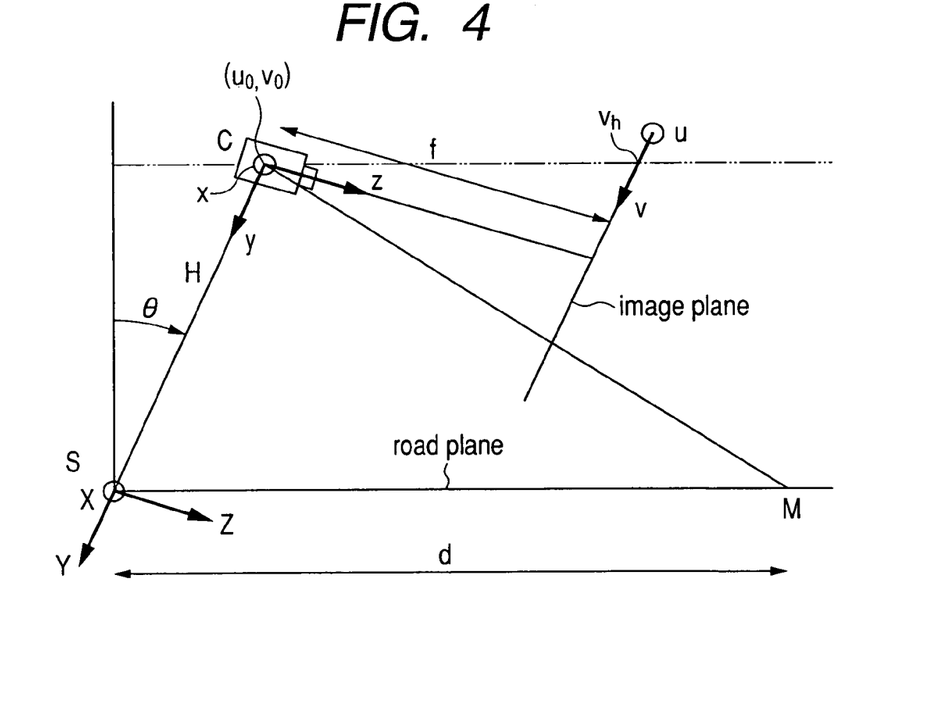
FIG. 4 is a diagram for describing parameters of a camera.

Equations (3) and (4) are derived as described in the following by using a model of the parameters of a camera C, shown in FIG. 4, assumed to be located above a flat surface referred as the road plane.

Coordinates in the image plane (i.e., plane of focus) of the camera C will be designated as (u, v). The coordinates of the center of the image sensor of the camera C (as expressed with respect to the image plane) will be designated as ($u_0$, $v_0$), an amount of tilt of the image sensor of camera C from a direction normal to the road plane is designated as θ, the v-axis coordinate of the point of projection of the horizon of the road plane on the image plane as $v_h$, the focal distance of the camera C as f, and the size of an image captured by the camera C (as measured in the image plane) as $t_{pu} \times t_{pv}$. In addition, assuming that $\alpha_u$ (=f/$t_{pu}$) is equal to $\alpha_v$ (=f/$t_{pv}$), each of these will be designated as α. M denotes a point on the road plane, ahead of the camera C.

In the absence of fog and with a road plane that is flat, a change in received luminance occurs at the v-axis position $v_h$ of the horizon, in a captured image. The position of that luminance change will be referred to as the inflection point. If there is fog in the region between the camera C and the horizon, the inflection point becomes shifted from $v_h$. That amount of change in the inflection point can be used to estimate the characteristics of fog in the region ahead of the camera C, as described in the following.

In the general case it is not possible to use a captured image to calculate the distance from a camera C to an observed object by using only a single camera. However if it is assumed that the road surface is flat, then the calculation becomes possible. It will be assumed that there is a directly proportional relationship between positions of points in the image plane and the corresponding positions in the plane of the image sensor of camera C (e.g., as for a pinhole camera). In that case, as shown in FIG. 4, the camera characteristics can be expressed by an x,y,z coordinate system in which the x,y plane (image sensor plane) is parallel to the image plane and the image plane is normal to the z-axis. On that assumption, the relationship between the x, y, z coordinate system and u, y coordinates in the image plane can be expressed by the following equations (5) and (6):

$$\begin{cases} u = u_0 + \alpha \cdot \dfrac{x}{z} & (5) \\ v = v_0 + \alpha \cdot \dfrac{y}{z} & (6) \end{cases}$$

In addition, the horizon projection point position $v_h$ can be expressed by the following equation (7), and the following equation (8) can be obtained from equation (7) and equation (6) above:

$$v_h = v_0 - \alpha \cdot \tan\theta \quad (7)$$

$$\frac{v - v_h}{\alpha} = \frac{y}{z} + \tan\theta \quad (8)$$

Designating H as the height of the camera C, as measured along the y-axis from a point S on the road surface, and designating the axes of a coordinate system of the road (centered on point S as origin) as X, Y, Z, which are respectively parallel to corresponding axes of the x, y, z system, the following equation (9) can be derived by expressing equation (8) in terms of the (X, Y, Z) coordinate system:

$$\frac{v - v_h}{\alpha} = \frac{Y + H}{Z} - \tan\theta \quad (9)$$

The coordinates of the point M on the road surface, at distance d from the origin point S, can then be obtained from the following equation 10. By combining equation (9) with equation (10), the following equation (11) can be derived:

$$M\begin{pmatrix} X \\ -d\cdot\sin\theta \\ d\cdot\cos\theta \end{pmatrix} \quad (10)$$

$$\frac{v-v_h}{\alpha} = \frac{H}{d\cdot\cos\theta} \quad (11)$$

By solving equation (11) for d, the following equation (12) can be derived:

$$d = \begin{cases} \frac{\lambda}{(v-v_h)} & (v > v_h) \\ \infty & (v \le v_h) \end{cases} \quad (12)$$

where $\lambda = H\cdot\alpha/\cos\theta$

Next, the following equation (13 can be derived from equations (2) and (12). By differentiating equation (13) with respect to v, the following equation (14) can then be derived, and by differentiating equation (14) with respect to v, the following equation (15) can then be derived:

$$I = R - (R - A_\infty)\left(1 - e^{-\beta\frac{\lambda}{v-v_h}}\right) \quad (13)$$

$$\frac{dI}{dv} = \frac{\beta\lambda(R-A_\infty)}{(v-v_h)^2}\cdot e^{-\beta\frac{\lambda}{v-v_h}} \quad (14)$$

$$\frac{d^2I}{dv^2} = \beta\cdot\varphi(v)\cdot e^{-\beta\frac{\lambda}{v-v_h}}\left(\frac{\beta\lambda}{v-v_h} - 2\right) \quad (15)$$

where $\phi(v) = \lambda(R-A_\infty)/(v-v_h)^3$

Of the non-zero solutions of equation (15), the solution for which β is not zero can be expressed by the following equation (16). In equation (16), $v_1$ denotes the inflection point, and $d_i$ denotes the distance value d that is obtained for the inflection point by inserting $v_i$ as v in equation (12) above.

Specifically, the inflection point can be obtained by double-differentiating a function that expresses luminance values of an image with respect to positions along the vertical direction (v-axis direction) of the image plane as a parameter, and finding a value of v for which the result becomes zero.

$$\beta = \frac{2(v_i - v_h)}{\lambda} = \frac{2}{d_i} \quad (16)$$

The above equation (3) expressing the deterioration parameter βd can then be derived from equations (12) and (16).

In addition, designating the measured luminance of the inflection point as $I_i$, the following equation (17) can be derived by replacing the variables I and d in equation (2) by $I_i$ and the inflection point distance $d_i$ respectively.

$$R = I_i + (R - A_\infty)(1 - e^{-\beta d_i}) \quad (17)$$

Equation (4) expressing the deterioration parameter $A_\infty$ can then be derived, by first modifying equation (14), to convert it to an equation expressing $(R-A_\infty)$, then inserting the resultant expression for $(R-A_\infty)$ into equation (17).

Having obtained values for the deterioration parameters βd and $A_\infty$, an actual (that is to say, intrinsic, unaffected by fog) luminance value R can be recovered from a corresponding measured deteriorated-luminance value I by applying the following equation (18), which can be derived by modifying equation (2).

$$R = I\cdot e^{\beta d} + A_\infty(1 - e^{\beta d}) \quad (18)$$

Kalman Filter

Figure 5:
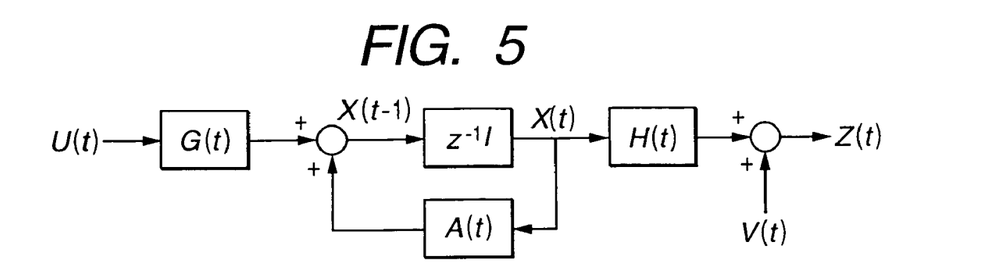
FIG. 5 illustrates a system model of the Kalman filter.

A general form of the Kalman filter will be described in the following. FIG. 5 is a diagram for describing a system model of the Kalman filter, in which t denotes time, Z(t) denotes a measurement vector, X(t) a state vector, U(t) the system noise, V(t) the measurement noise, A(t) denotes a state transition matrix, G(t) a drive matrix and H(t) a measurement matrix. The system model can be expressed by the following equations (19) and (20):

$$X(t+1) = A(t)X(t) + G(t)U(t) \quad (19)$$

$$Z(t) = H(t)X(t) + V(t) \quad (20)$$

The system noise Ut and the measurement noise Vt will be assumed to have respective normal distributions of N(0, S(t)) and N(0, T(t)), with S(t) and T(t) being the respective covariance matrices of these normal distributions.

In the following, when estimating a state by using a Kalman filter algorithm, estimation of a future state will be referred to as "prediction" and estimation of the current state will be referred to as "filtering".

Designating $X_b(t)$ as the average vector of the predicted distribution p(X(t)|Z(t−1)) which is obtained for the state at time t−1 (with that vector being referred to in the following as the prediction vector), designating the covariance matrix of prediction as $P_b(t)$, designating $X_a(t)$ as the average vector of the predicted distribution p(X(t)|Z(t)) for the state at time t (with that vector being referred to in the following as the estimated vector) and the corresponding covariance matrix of estimation as $P_b(t)$, and designating the Kalman gain for time t as K(t), then as is known, these can be expressed by the following equations (21) to (25):

[Prediction]

$$X_b(t) = A(t-1)X_a(t-1) \quad (21)$$

$$P_b(t) = A(t-1)P_a(t-1)(t-1)^T + Q_U(t-1) \quad (22)$$

[Filtering]

$$X_a(t) = X_b(t) + K(t)[Z(t) - H(t)X_b(t)] \quad (23)$$

$$P_a(t) = P_b(t) - K(t)H(t)P_b(t) \quad (24)$$

[Kalman Gain]

$$K(t) = P_b(t)H(t)^T[H(t)P_b(t)H(t)^T + Q_v(t)]^{-1} \quad (25)$$

Here, $Q_u(t)$ is the covariance matrix of system noise which is expressed as $G(t)S(t)G^T(t)$, and $Q_v(t)$ is the covariance matrix of the measurement noise.

$P_b(t)$ and $P_a(t)$ are respective estimated error covariance matrices, which can be expressed by the following equations (26) and (27):

$$P_b(t) = E[(X(t) - X_b(t))(X(t) - X_b(t))^T] \quad (26)$$

$$P_a(t) = E[(X(t) - X_a(t))(X(t) - X_a(t))^T] \quad (27)$$

Image Model

Application of the Kalman filter to an image model with the present invention will be described in the following. Motion compensation and Kalman filter processing are applied for each of respective pixel blocks constituting an input image.

Figure 6A:
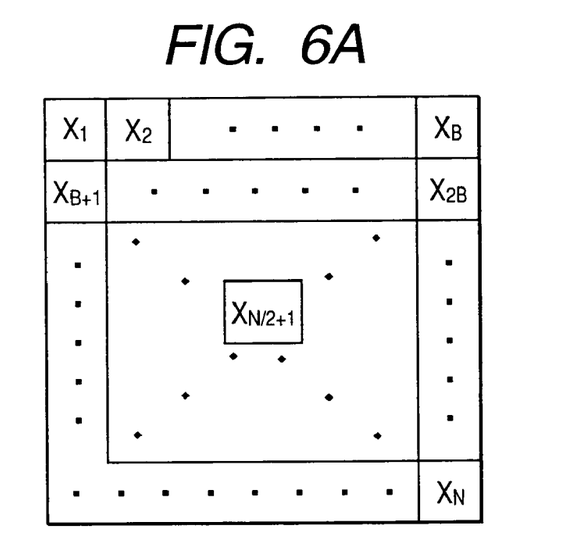
FIGS. 6A, 6B are diagrams for describing the calculation of motion vectors between successively obtained input images.
Figure 6B:
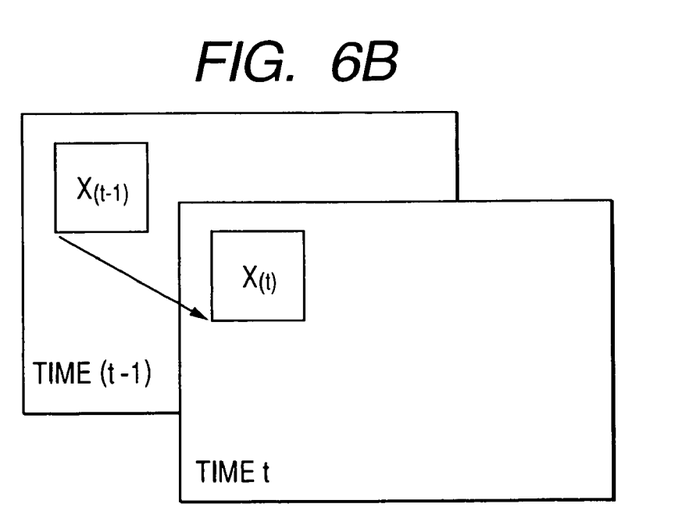

Designating the number of pixels of each pixel block as N, the array of N luminance values of the currently-processed pixel block constitutes the state vector X(t) for the Kalman filter, having N elements $X_1(t), X_2(t), \ldots X_N(t)$. Specifically, as illustrated in FIG. 6A, the vector elements $X_i t$ (i=1, 2, ..., N) correspond to picture elements at respective positions along a raster scan sequence (from upper left to lower right side) in the block. Using the state vector X(t), a model of the block within an original image can be defined in the form of equation (28) below. The system noise Ut will be assumed to be Gaussian white noise having an average value of zero and a covariance au. The drive matrix G(t) of equation (19) above is assumed to be a unit matrix.

$$\begin{bmatrix} X_1(t+1) \\ X_2(t+1) \\ \vdots \\ X_N(t+1) \end{bmatrix} = A(t) \begin{bmatrix} X_1(t) \\ X_2(t) \\ \vdots \\ X_N(t) \end{bmatrix} + \begin{bmatrix} U_1(t) \\ U_2(t) \\ \vdots \\ U_N(t) \end{bmatrix} \quad (28)$$

Images are assumed to be acquired successively at times (t−1), t, (t+1), ..., with the interval in which the current image is acquired and processed being referred to as the current cycle, i.e., corresponding to time t. The luminance values of a pixel block $X_i(t+1)$ (where i=1, 2, ..., N) in an image obtained at time (t+1) should (in the absence of variations due to noise, fog effects, etc.) be respectively similar to those in a corresponding pixel block $X_i(t)$ in the image obtained at the preceding time t. If some image motion has occurred between (t+1) and t, then the position of the pixel block $X_i(t+1)$ will be shifted from that of the block $X_i(t)$, with the amount and direction of shift being expressed as a motion vector.

It will be assumed that each pixel block of an input image can be expressed by a model in accordance with the above equation (20). The measurement noise Vt will be assumed to be Gaussian white noise V(t) having an average value of zero and a covariance $\sigma_V^2$.

An algorithm expressed by the above equations (21) to (25) is used in applying Kalman filter processing to the model expressed by equations (26) and (20). This is done by deriving estimated values for the state transition matrix A(t), the measurement matrix H(t), the system noise covariance matrix $Q_u(t)$ and the measurement noise covariance matrix $Q_v(t)$, i.e., the unknowns in these equations, and applying the estimated matrices in the equations. In that way, each pixel block of a restored image can be obtained by applying the luminance values of the block as the measurement vector Z(t) in Kalman filter processing for recovering the state vector X(t).

The derivation of the state transition matrix A(t), measurement matrix H(t), system noise covariance matrix $Q_u(t)$ and measurement noise covariance matrix $Q_v(t)$ are described in the following.

Measurement Matrix H(t)

It is assumed that, when processing a pixel block, the same value of the deterioration parameter βd can be applied for all of the elements of the block. Specifically, the value of the variable v in equation (3) is set as the v-axis position of the central pixel of the pixel block, and a corresponding value of βd thereby calculated using equation (3). Since that value of βd is to be applied for all of the elements of the measurement vector Z(t), the measurement matrix H(t) becomes a scalar matrix, in which the scalar is an inverse exponential function of βd, i.e., as expressed in equation (29):

$$H(t) = \begin{bmatrix} e^{-\beta d} & 0 & 0 & \cdots & 0 & 0 & 0 \\ 0 & e^{-\beta d} & 0 & \cdots & 0 & 0 & 0 \\ 0 & 0 & e^{-\beta d} & \cdots & 0 & 0 & 0 \\ \vdots & \vdots & \vdots & \ddots & \vdots & \vdots & \vdots \\ 0 & 0 & 0 & \cdots & e^{-\beta d} & 0 & 0 \\ 0 & 0 & 0 & \cdots & 0 & e^{-\beta d} & 0 \\ 0 & 0 & 0 & \cdots & 0 & 0 & e^{-\beta d} \end{bmatrix} \quad (29)$$

The expression $[Z(t)-H(t)X_b(t)]$ in equation (23) represents the difference between the measurement vector Z(t) and the product of H(t) and the prediction vector $X_b(t)$. However as can be understood from equation (2) above, each measured luminance value of the current input image includes a dispersed-light component $A_\infty(1-e^{-\beta d})$. Hence with the present invention, equation (23) for the filtering phase of the Kalman filter algorithm is replaced by the following modified equation (30):

$$X_a(t) = X_b(t) + K(t)[Z(t) - (H(t)X_b(t) + A_\infty(1-e^{-\beta d}))] \quad (30)$$

State Transition Matrix

The state transition matrix A(t−1) expresses a change in the state vector X(t) that has occurred between the current cycle (time t) and the preceding cycle (time (t−1)). In deriving the state transition matrix, block matching is used to obtain a motion vector for the current pixel block (more precisely, a provisionally restored version of the block, as described hereinafter). The block motion vector specifies a (motion-compensated) corresponding pixel block in an estimated image, where the estimated image is formed of estimated pixel blocks which were each derived as an estimated vector $X_a(t)$ from equation (24) in the preceding cycle, and were stored as described hereinafter.

In deriving the state transition matrix A(t−1), it is assumed that each pixel in the current pixel block has a value that occurs in the motion-compensated corresponding block from the preceding cycle. The state transition matrix is an N-row by N-column array (where N is the total number of pixels in a block) in which the column values correspond to respective picture element (luminance) values at time (t−1), i.e., values in the motion-compensated corresponding block from the preceding cycle, while the row values correspond to respective picture element values at time t, i.e., values in the current pixel block. Each element of the state transition matrix can take only the values 0 or 1, and each of the rows of the state transition matrix contains a single element having the value 1.

Figure 7A:
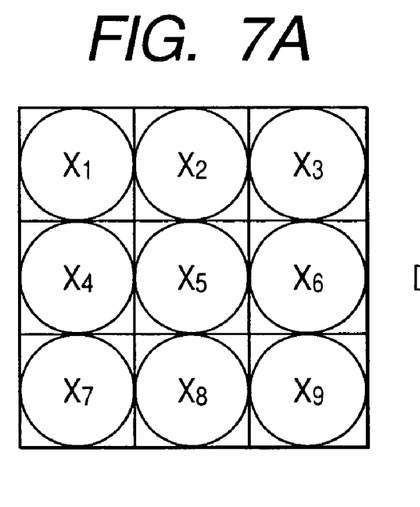
FIGS. 7A, 7B, 7C are diagrams for describing a state transition matrix used with the Kalman filter.
Figure 7B:
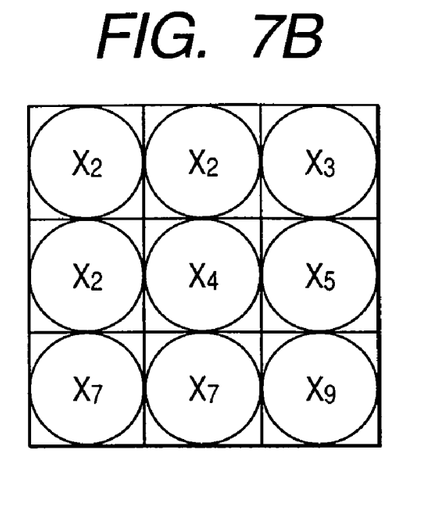

For example, it will be assumed that each pixel block is a (3×3) array of nine picture elements as illustrated in FIG. 7A, having respective luminance values indicated as $X_1$ to $X_9$ at time t. It is assumed that the pixel values change to those shown in FIG. 7B by the succeeding time (t+1) (i.e., the succeeding processing cycle). Thus for example at time (t+1), the value of the first pixel in the raster-scan sequence has changed to that of the second pixel at time t, i.e., X2.

Figure 7C:
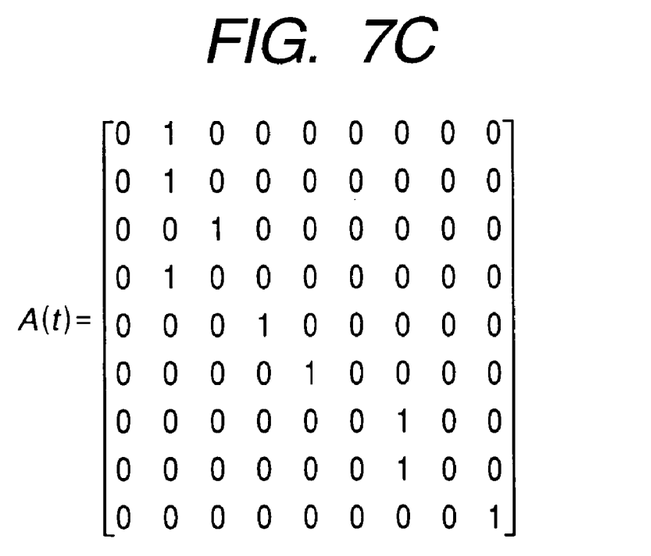

In the corresponding state transition matrix shown in FIG. 7C, the successive rows from top to bottom respectively correspond to the first to ninth pixels of the block at time (t+1), while successive columns from left to right respectively correspond to the first to ninth pixels of the block at time t. Thus in the first (top) row for example, the 1 digit in the second column position indicates that, at time (t+1), the first pixel has a value (X2) which is that of the second pixel at time t.

When images are being captured of a region affected by dense fog, the image contrast becomes decreased. As a result, it may become impossible to accurately calculate the motion vectors. With the present invention however as described hereinafter, instead of directly using each block of an input image for calculating a corresponding motion vector, processing based on equation (18) above is applied to convert the current pixel block to a provisionally restored pixel block (i.e., "provisionally", since not yet restored to the extent that is achieved by the Kalman filter processing). The motion vector corresponding to the current pixel block is then obtained by block matching against the above-mentioned estimated image from the preceding cycle, with the provisionally restored prediction block being utilized in the block matching processing in place of the current pixel block.

In that way each motion vector can be accurately derived, since the provisionally restored pixel block can have sufficiently high image contrast even if the current input image is affected by fog.

Since block matching techniques for deriving motion vectors between blocks of pixels in successive digitized images are well known, detailed description is omitted herein.

Noise Covariance Matrices

The covariance matrix $Q_u(t)$ of the system noise can be expressed by equation (31) below, assuming that the system noise has a fixed proportion throughout the pixel block, i.e., $Q_u(t)$ is a scalar matrix in which the scalar value is the covariance $\sigma_u^2$.

$$Q_U(t) = \begin{bmatrix} \sigma_u^2 & 0 & 0 & \cdots & 0 & 0 & 0 \\ 0 & \sigma_u^2 & 0 & \cdots & 0 & 0 & 0 \\ 0 & 0 & \sigma_u^2 & \cdots & 0 & 0 & 0 \\ \vdots & \vdots & \vdots & \ddots & \vdots & \vdots & \vdots \\ 0 & 0 & 0 & \cdots & \sigma_u^2 & 0 & 0 \\ 0 & 0 & 0 & \cdots & 0 & \sigma_u^2 & 0 \\ 0 & 0 & 0 & \cdots & 0 & 0 & \sigma_u^2 \end{bmatrix} \quad (31)$$

Similarly, the covariance matrix $Q_v(t)$ of the measurement noise can be expressed by equation (32) below, assuming that the measurement noise has a fixed proportion throughout the pixel block, i.e., $Q_v(t)$ is a scalar matrix in which the scalar value is the covariance $\sigma_v^2$.

$$Q_V(t) = \begin{bmatrix} \sigma_v^2 & 0 & 0 & \cdots & 0 & 0 & 0 \\ 0 & \sigma_v^2 & 0 & \cdots & 0 & 0 & 0 \\ 0 & 0 & \sigma_v^2 & \cdots & 0 & 0 & 0 \\ \vdots & \vdots & \vdots & \ddots & \vdots & \vdots & \vdots \\ 0 & 0 & 0 & \cdots & \sigma_v^2 & 0 & 0 \\ 0 & 0 & 0 & \cdots & 0 & \sigma_v^2 & 0 \\ 0 & 0 & 0 & \cdots & 0 & 0 & \sigma_v^2 \end{bmatrix} \quad (32)$$

With this embodiment, the noise covariances $\sigma_v^2$ and $\sigma_u^2$ are appropriate predetermined fixed values, e.g., with each being set as 100. However the invention is not limited to this, and it would be equally possible to use any of various known methods of measurement, etc., for deriving the noise covariance values to be used in applying the Kalman filter.

Thus as can be seen from the above, by applying the Kalman filter to the deterioration model, luminance-restored images respectively corresponding to a plurality of successive time points can be obtained, with each restored image obtained as an array of recovered pixel blocks. It thereby becomes possible to adaptively eliminate the effects of fog upon the input images received from the camera, based on deriving degrees of correlation between successive images while taking into account the effects of noise, etc., without requiring the use of statistical quantities other than those relating to the images.

Configuration of Image Restoration Section

Figure 8:
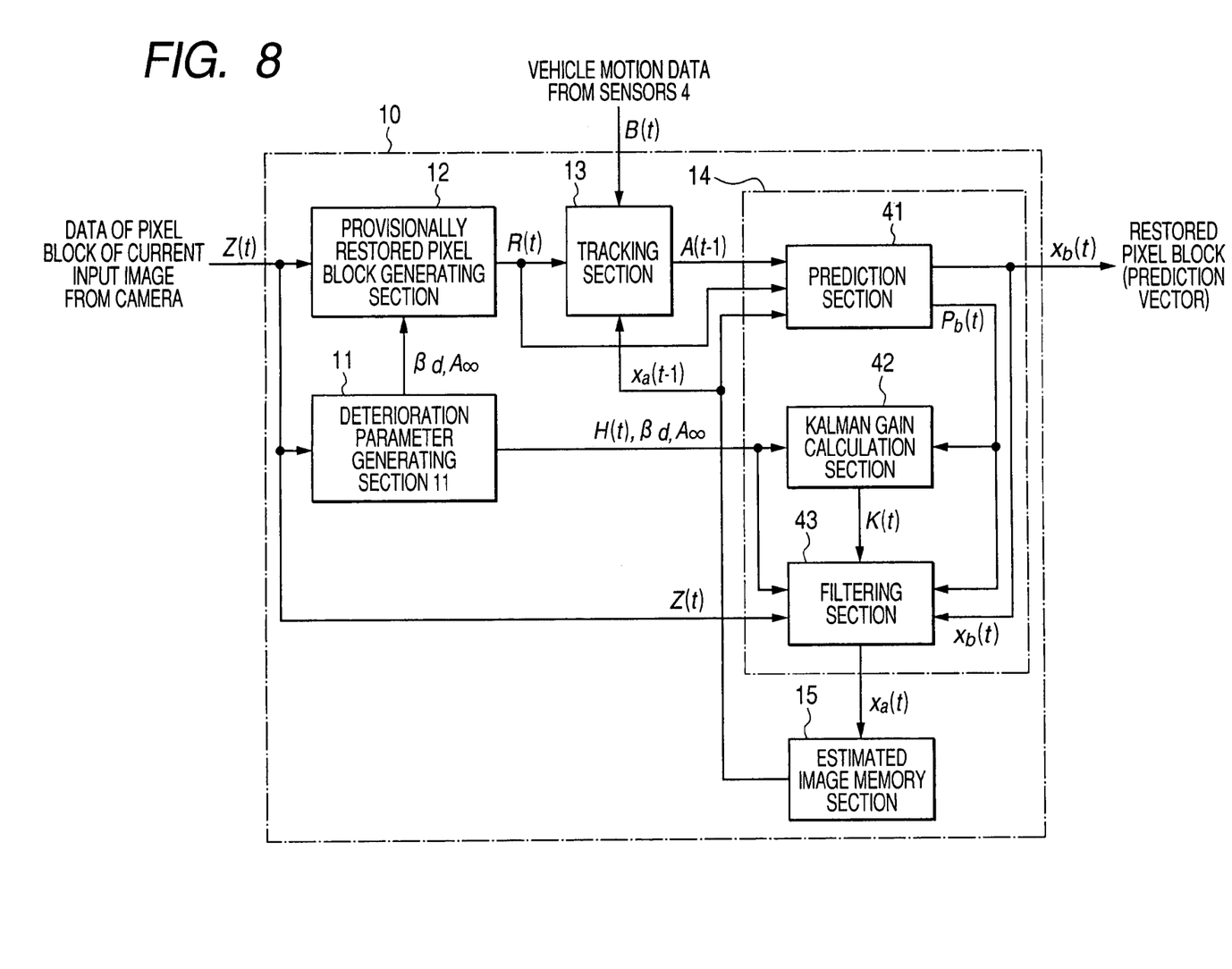
FIG. 8 is a functional block diagram for describing an image restoration section in the embodiment.

FIG. 8 is a functional block diagram of the image restoration section 10 of FIG. 1, which executes the processing described above. It should be understood that the various blocks shown in FIG. 8 conceptually represent respective processing operations performed by a microcomputer.

As shown, the image restoration section 10 includes a deterioration parameter generating section 11, a provisionally restored pixel block generating section 12, a tracking section 13, an adaptive filter section 14 and an estimated image memory section 15. The deterioration parameter generating section 11 obtains the v-axis position $v_1$ of an inflection point of luminance in the current input image from the camera 3 based on the luminance values of that input image, as described above referring to the model of FIG. 4. The deterioration parameter generating section 11 uses $v_i$ in equation (4) to calculate the value of the deterioration parameter $A_\infty$ for the current input image, and uses $v_i$ and the v-axis position of the central pixel of the currently-processed pixel block (as the value of the variable v) in equation (3), to calculate the deterioration parameter $\beta d$ for the current pixel block. That value of $\beta d$ is then used to obtain the measurement matrix H(t) expressed by equation (29) above, for use together with $A_\infty$ in Kalman filter processing of the current pixel block.

Although omitted from the drawings for simplicity of description, it will be understood that the image restoration section 10 also includes a memory for holding each current input image received from the camera 3, during processing of the pixel blocks of that image, e.g., a frame memory, when the input image data consist of respective video signal frames.

The provisionally restored pixel block generating section 12 generates a provisionally restored pixel block (i.e., provisionally restored vector R(t)) from the current pixel block (measurement vector Z(t)) based on the calculated values of $\beta d$ and $A_\infty$ produced from the deterioration parameter generating section 11, by applying equation (18) above. The provisionally restored vector R(t) is supplied to the tracking section 13, which may also receive vehicle motion information from the sensors 4.

Specifically, each luminance value of the currently-processed pixel block from the input image is multiplied by $e^{\beta d}$ (equivalent to multiplying the measurement vector by the inverse of the measurement matrix H(t)) and the value $A_\infty(1-e^{\beta d})$ is added to the result, to thereby obtain corresponding provisionally restored luminance values for the respective pixels.

The tracking section 13 performs block matching processing for the current pixel block to derive the corresponding state transition matrix A(t-1). Specifically, in the current cycle, data expressing an estimated image (held in the estimated image memory section 15) are read out. The estimated image has been generated in the preceding cycle as an array of estimated prediction blocks, each of which has been calculated as an estimated vector $X_a(t)$ by applying equation (30) above. If vehicle motion information B(t) is received from the sensors 4, motion compensation is applied overall to the estimated image, i.e., in accordance with the amount and direction of vehicle motion that has occurred since the preceding cycle.

In the current cycle, block matching is performed between the provisionally restored pixel block (provisionally restored vector R(t)) and the estimated image that was stored in the preceding cycle, to obtain a motion vector, i.e., to extract a motion-compensated corresponding pixel block $X_a(t-1)$ from the estimated image.

The luminance values of that pixel block $X_a(t-1)$ are then respectively compared with those of the provisionally restored block R(t) to derive the state transition matrix A(t-1), as described above referring to FIGS. 7A to 7C.

The provisionally restored pixel block (provisionally restored vector R(t)), the state transition matrix A(t-1) that is generated by the tracking section 13, the measurement matrix H(t), the calculated values of the deterioration parameters βd and $A_\infty$ (each derived by the deterioration parameter generating section 11), and the motion-compensated corresponding pixel block $X_a(t-1)$, are each inputted to the adaptive filter section 14. The adaptive filter section 14 applies the above-described Kalman filter processing to derive a restored pixel block (prediction vector $X_b(t)$). This is done for each pixel block of the current input image, to thereby obtain a restored image as an array of restored pixel blocks.

In addition, in processing a current pixel block, the adaptive filter section 14 derives values of an estimated pixel block (estimated vector $X_a(t)$) for use in the succeeding cycle. The estimated image memory section 15 stores the estimated pixel block values, as part of the above-mentioned estimated image, to be used by the tracking section 13 in block matching in the next cycle.

Adaptive Filter Section

The adaptive filter section 14 includes a prediction section 41, a Kalman gain calculation section 42 and a filtering section 43. The prediction section 41 derives values for the prediction vector $X_b(t)$ (i.e., a restored pixel block that is outputted from the image restoration section 10) and the prediction covariance matrix $P_b(t)$ by calculations using equations (21) and (22) above. The calculations are based on the provisionally restored vector R(t), the state transition matrix A(t-1), the estimated vector $X_a(t-1)$ derived in the preceding cycle as described above, the covariance matrix $P_a(t)$, and the system noise covariance matrix $Q_u(t)$ obtained by equation (31).

The Kalman gain calculation section 42 calculates the Kalman gain K(t) by applying equation (25) above, based on the measurement matrix H(t), the prediction covariance matrix $P_b(t)$, and the measurement noise covariance matrix $Q_v(t)$ obtained by equation (32).

The filtering section 43 calculates the estimated vector $X_a(t)$ and the covariance matrix $P_b(t)$ by using equations (30) and (24), based on the measurement vector Z(t), the measurement matrix H(t), the deterioration parameters $\beta_d$ and $A_\infty$, the prediction vector $X_b(t)$ supplied from the prediction section 41, the covariance matrix $P_a(t)$, and the Kalman gain K(t) derived by the Kalman gain calculation section 42.

Figure 9:
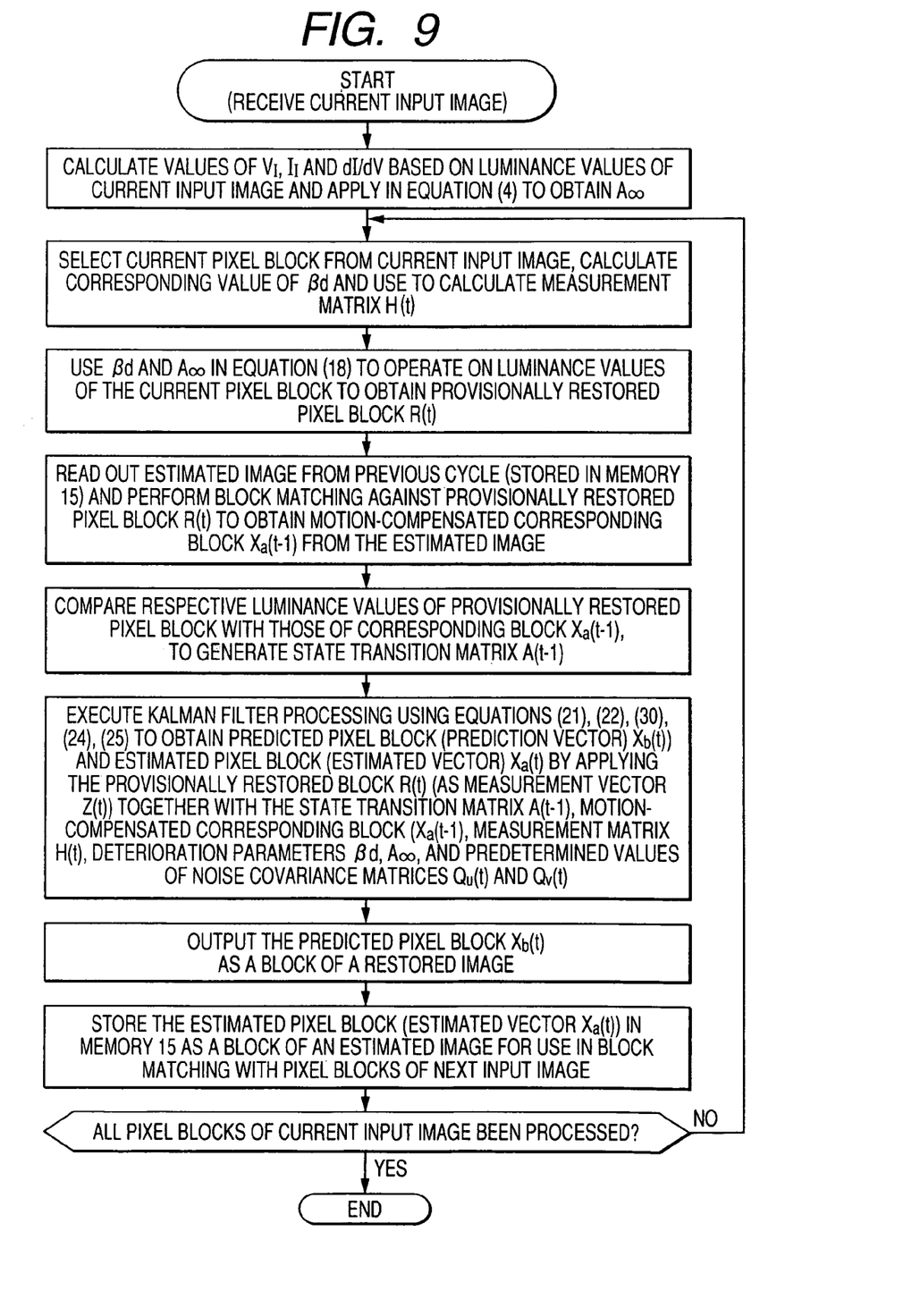
FIG. 9 is a flow diagram illustrating processing that is executed by the image restoration section.

As can be understood from the above, the image restoration section 10 can operate by executing the sequence of processing steps shown in FIG. 9 each time the data of an input image are received from the camera. However it will be understood that it is not actually necessary to calculate the deterioration parameter βd separately for each of the pixel blocks of an input image, since the same distance value d is applicable for each block in a row of pixel blocks (i.e., each having the same v-axis position).

In that way, the image restoration section 10 successively generates restored images with the effects of fog substantially removed, from each of successive fog-affected images. This is achieved by applying a Kalman filter algorithm to the deterioration model described above, with the execution of that algorithm corresponding to the adaptive filter section 14 in FIG. 8.

With equation (4) above, when the value of v exceeds $v_h$ (the height of the horizon), the value of $A\infty$ becomes equal to $I_i$ (measured luminance at the inflection point). However with equation (3), the value of the deterioration parameter βd becomes infinite when v exceeds $v_h$. In that case processing of pixel blocks corresponding to regions above the horizon would not be possible. For that reason with this embodiment, an appropriate fixed value of βd is predetermined, and is applied (together with the fixed value of $I_i$ for $A\infty$) in the calculations performed for each pixel block whose center has a v-axis value above the horizon value $v_h$. (specifically, in the calculations of equations (29) and (30)).

Effects

With the driver support apparatus 1 described above, when the restored image display switch 5 is switched off, the application execution section 8 directly operates on input images from the camera 3. When the restored image display switch 5 is switched on, the application execution section 8 operates on restored images, having improved contrast. The application execution section 8 can use the restored images for various functions such as display image changeover control and driver support control, etc.

It will be understood that when a vehicle incorporating the above embodiment is being driven under conditions of fog, the effects of the fog on images displayed to the vehicle driver can be substantially eliminated, by actuating the restored image display switch 5. In addition, in that condition, various types of image processing can be performed based on the restored images. Since the effects of fog are substantially removed from the restored images, enhanced reliability can thereby be achieved for various functions such as drive support control, etc.

As described above, the adaptive filter section 14 of the image restoration section 10 uses a Kalman filter algorithm such as to treat the effects of fog on an input images as being a characteristic of the measurement system, rather than treating the effects of fog as being noise, as is done in the prior art.

Specifically, the measurement matrix H(t) (used in the filtering phase of the Kalman filter algorithm) is based on the degree of fog-caused attenuation of light that is transmitted from a distant location to the camera, while intrinsic luminance values of the scene captured by the camera constitute the state vector X(t) for the Kalman filter. Predicted values $X_b(t)$ for the state vector (i.e., a restored pixel block having the effects of fog excluded) can be thereby be derived for each of the pixel blocks of an input image, through image processing that is optimized in accordance with the characteristics of the fog.

Furthermore, when the image restoration section 10 performs block matching for a pixel block of an input image, it utilizes a provisionally restored pixel block (i.e., provisionally restored vector R(t)) which has the luminance-deteriorating effects of fog reduced, rather than directly using the block from the input image. This is achieved in a simple manner, by utilizing the deterioration parameters βd and $A_\infty$. Increased reliability of block matching, to derive motion vectors as described above, can thereby be achieved when the input images are affected by fog.

As a result, improved reliability of operation of the adaptive filter section 14 under conditions of fog can be achieved.

Alternative Embodiments

It should be noted that the present invention is not limited to the embodiment described above, and that various other configurations may be envisaged which fall within the scope claimed for the invention.

For example with the above embodiment, the restored image display switch 5 is utilized, i.e., is manually actuated by the vehicle driver when necessary. However it would be equally possible to utilize (in place of the restored image display switch 5, or in addition to it) a fog detection section that detects the extent to which input images are being affected by fog. This can be implemented by applying appropriate image processing to the images obtained by the camera 3. In that case, when it is judged that the input images are being affected by fog, the application execution section 8 can be controlled to automatically change from operating directly on each input image to operating on the restored images.

A specific configuration for such a fog detection section is described for example in Japanese patent publication No. 2006-349492, so that detailed description is omitted.

Furthermore, although a block matching method is used by the tracking section 13 of the above embodiment for deriving motion vectors, the invention is not limited to this, and any of various other known methods of obtaining motion vectors could be utilized.

In addition, with the above embodiment the covariance matrices $P_b(t)$ and $P_a(t)$ are described as being derived from equations (22) and (24) respectively. However it would be equally possible to derive $P_b(t)$ and $P_a(t)$ from modified forms of the equations (26) and (27) respectively, with X(t) being replaced by the provisionally restored vector R(t).

What is claimed is:

1. An image processing apparatus coupled to receive successive periodically obtained data sets expressing respective input images, including fog-affected images captured under conditions of fog, said image processing apparatus operating on said input images during respective processing cycles to generate corresponding restored images having effects of the fog at least partially removed;
wherein:
said image processing apparatus comprises image restoration circuitry configured to convert a current pixel block of a current one of said input images to a corresponding restored pixel block, by applying Kalman filter processing to obtain predicted values of a state vector which expresses intrinsic luminance values of said current pixel block, and comprises derivation circuitry configured to derive a deterioration parameter value as a product of an estimated distance of an external location represented by said current pixel block and an estimated value of an extinction coefficient of the atmosphere;
said Kalman filter processing is executed by applying
a measurement vector expressing measured luminance values of said current pixel block,
a measurement matrix, determined based on said deterioration parameter value expressing respective extents of deterioration of said measured luminance values, and
a state transition matrix expressing relationships between said measured luminance values of said current pixel block and respective luminance values of a corresponding pixel block in an estimated image, said estimated image having been derived beforehand based on applying said Kalman filter processing to a preceding one said input images;
and wherein said restored pixel block is obtained as a restored vector constituted by said predicted values of the state vector, and each of said restored images is obtained as an array of restored pixel blocks.

2. An image processing apparatus according to claim 1, comprising circuitry configured to perform a sequence of processing operations during each of said processing cycles, comprising:
deriving an estimated pixel block as an estimated vector by a calculation based on said measurement vector, and storing said estimated pixel block as a part of an estimated image, for use in a succeeding processing cycle;
deriving a provisionally restored pixel block as a provisional restored vector by a calculation based on multiplying said measurement vector by an inverse of said measurement matrix; and
deriving said state transition matrix by comparing said provisionally restored pixel block with a corresponding motion-compensated pixel block, said corresponding motion-compensated pixel block being extracted from an estimated image which was derived and stored in a preceding processing cycle.

3. An image processing apparatus according to claim 2, wherein said image processing apparatus comprises circuitry configured to judge a condition of luminance variations within said current input image and to calculate respective values of a first deterioration parameter and a second deterioration parameter based on results of said judgement, and wherein:
said first deterioration parameter expresses a dispersed-light component of each of said measured values of luminance in said current image, where said dispersed-light component results from dispersion of light by said fog;
a specific values of said second deterioration parameter is calculated corresponding to said current pixel block, said specific value expressing an estimated deterioration factor of said measured luminance values of said corresponding pixel block;
said measurement matrix is established based on said second deterioration parameter; and
in processing said current pixel block, said provisionally restored vector is derived by operating on each measured luminance value of said current pixel block by a calculation based upon said first deterioration parameter and said corresponding value of the second deterioration parameter.

4. An image processing apparatus according to claim 3, wherein said second deterioration parameter is obtained as the product of an estimated distance of an external location portrayed by said pixel block and an estimated value of an extinction coefficient of the atmosphere, and wherein said measurement matrix is a scalar matrix comprising a scalar value that is an inverse exponential function of said second deterioration parameter.

5. An image processing apparatus according to claim 4, wherein said estimated distance is calculated based on a position of said pixel block within said current input image and wherein said estimated value of the extinction coefficient of the atmosphere is calculated based upon said luminance variations within said current input image.

6. An image processing apparatus according to claim 2, wherein:

said state transition matrix comprises a plurality of rows each corresponding to a specific pixel in said current pixel block and a plurality of columns each corresponding to a specific pixel of said corresponding motion-compensated pixel block; and each of said rows comprises a single 1 digit with remaining elements of said row being 0 digits, and with respective positions of said 1 digits within said rows being indicative of a relationship between luminance values of pixels in said current pixel block and luminance values of pixels in said motion-compensated corresponding pixel block.

7. A driver support apparatus comprising:

an image processing apparatus as claimed in claim 1;

a camera apparatus installed in a vehicle for capturing said input images as successive images of a region external to said vehicle and for supplying data expressing said input images to said image processing apparatus; and a display apparatus coupled to receive data expressing said restored images from said image processing apparatus, for generating a visible display of said restored images.

8. A driver support apparatus according to claim 7, comprising:

target object detection circuitry configured to detect objects located external to said vehicle, based on said restored images, and control circuitry configured to control equipment of said vehicle in accordance with results obtained by said target object detection circuitry, for providing support to a driver of said vehicle.

* * * * *

UNITED STATES PATENT AND TRADEMARK OFFICE
CERTIFICATE OF CORRECTION

| | | |
|---|---|---|
| PATENT NO. | : 8,098,890 B2 | Page 1 of 1 |
| APPLICATION NO. | : 12/157742 | |
| DATED | : January 17, 2012 | |
| INVENTOR(S) | : Miki Haseyama | |

It is certified that error appears in the above-identified patent and that said Letters Patent is hereby corrected as shown below:

Title Page 2, Other Publications, Doblinger, "pp. 305-038" should be -- pp. 305-308 --

Col. 15, line 64, claim 1, after "value" insert a -- , --

Col. 16, line 40, claim 3, "values" should be -- value --

Signed and Sealed this

Eleventh Day of September, 2012

David J. Kappos
*Director of the United States Patent and Trademark Office*